United States Patent
Sumitomo (10) Patent No.: US 7,234,110 B2
(45) Date of Patent: Jun. 19, 2007

(54) APPARATUS AND METHOD FOR PROVIDING DYNAMIC MULTILINGUAL WEB PAGES

(75) Inventor: Takaaki Sumitomo, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 455 days.

(21) Appl. No.: 10/368,392

(22) Filed: Feb. 20, 2003

(65) Prior Publication Data
US 2003/0187827 A1    Oct. 2, 2003

(30) Foreign Application Priority Data
Mar. 29, 2002   (JP)   ............................. 2002-095147

(51) Int. Cl.
*G06F 15/00*    (2006.01)
(52) U.S. Cl. .................................... 715/513
(58) Field of Classification Search .............. 715/513, 715/713; 704/8, 513
See application file for complete search history.

(56) References Cited

U.S. PATENT DOCUMENTS

| | | | | |
|---|---|---|---|---|
| 5,956,740 A * | 9/1999 | Nosohara | .................. | 715/536 |
| 5,974,372 A * | 10/1999 | Barnes et al. | .................. | 704/8 |
| 6,006,221 A * | 12/1999 | Liddy et al. | .................. | 707/5 |
| 6,457,030 B1 * | 9/2002 | Adams et al. | .................. | 715/523 |
| 6,623,529 B1 * | 9/2003 | Lakritz | .................. | 715/536 |
| 6,701,376 B1 * | 3/2004 | Haverstock et al. | .................. | 709/246 |
| 6,877,135 B1 * | 4/2005 | Kamiwada et al. | ...... | 715/501.1 |
| 7,007,026 B2 * | 2/2006 | Wilkinson et al. | .................. | 707/10 |
| 2001/0032218 A1 * | 10/2001 | Huang | .................. | 707/513 |
| 2002/0120762 A1 * | 8/2002 | Cheng et al. | .................. | 709/230 |
| 2003/0009505 A1 * | 1/2003 | Cuomo et al. | .................. | 709/103 |
| 2005/0149315 A1 * | 7/2005 | Flangan et al. | .................. | 704/2 |

FOREIGN PATENT DOCUMENTS

| | | |
|---|---|---|
| KR | 2000-39748 | 7/2000 |
| KR | 2000-0051520 | 8/2000 |

OTHER PUBLICATIONS

Chau et al.; "Explorative Multilingual Text Retrieval Based on Fuzzy Multilingual Keyword Classification"; ACM; pp. 33-35, & 37.*
Sakaguchi et al.; A Browsing Tool For Multi-lingual Document For Users Without Multi-lingual Fonts; ACM; 1996; pp. 63-71.*
Huang et al.,"Issues of Content and Structure for a Multilingual Web Site",ACM, 2001, pp. 103-110.*
Chau et al.; "Explorative Multilingual Text Retrieval Based on Fuzzy Multilingual Keyword Classification"; 2000; ACM; pp. 33-35, & 37.*

* cited by examiner

Primary Examiner—Doug Hutton
Assistant Examiner—James Debrow
(74) Attorney, Agent, or Firm—Oliff & Berridge, PLC (57) ABSTRACT

A web page providing method for providing a web page responsive to a request from a browser, including the steps of preparing a plurality of types of web pages responsive to a display request from the browser for each display request, selecting a web page based on specification information from among the plurality of types of web pages, and providing the selected web page for the browser.

3 Claims, 6 Drawing Sheets

```
<HTML><HEAD><TITLE>sample</TITLE></HEAD>
<BODY>
<BR><BR><CENTER>SANPURU PĒJI<BR><BR>
            ⋮

<% if ( request.getMethod () . equals ("GET")) { %>
      <H3>HAJIME MASHITE</H3>
<% } else { %>                                        ---701
      <H3>KONNICHIHA</H3>
<% } %>

XYZ NO SEKAI DESU
<BR><BR>

<%= new Date () . toString () %></CENTER>            ---702

</BODY></HTML>
```

FIG. 9
RELATED ART

SAMPLE PAGE

Submit       Reset

KONNICHIHA

XYZ NO SEKAI DESU

Wed Dec 19 15:54:31 JST 2001

FIG. 10A

```
sample = sample page
Hello = Hello
word = This is XYZ world
```

FIG. 10B

```
sample = SANPURU PĒJI
Hello = KONNICHIHA
word = XYZ NO SEKAI DESU
```

APPARATUS AND METHOD FOR PROVIDING DYNAMIC MULTILINGUAL WEB PAGES

BACKGROUND OF THE INVENTION

1. Field of the Invention

This invention relates to a web page providing method and apparatus and program and in particular to a web page providing method and apparatus and program capable of providing a web page of appropriate type upon reception of a display request from a browser.

2. Description of the Related Art

In recent years, the Internet users have increased rapidly and various pieces of information have been provided by various methods accordingly. For example, in some of web services most frequently used among the services using the Internet, a web page displayed when the user accesses with a web browser is changed dynamically matching each user.

A dynamic web page generally is provided by web application; it is used when a web page in the language matched with the environment of the browser used by the user is provided, etc., for example.

Figure 7:
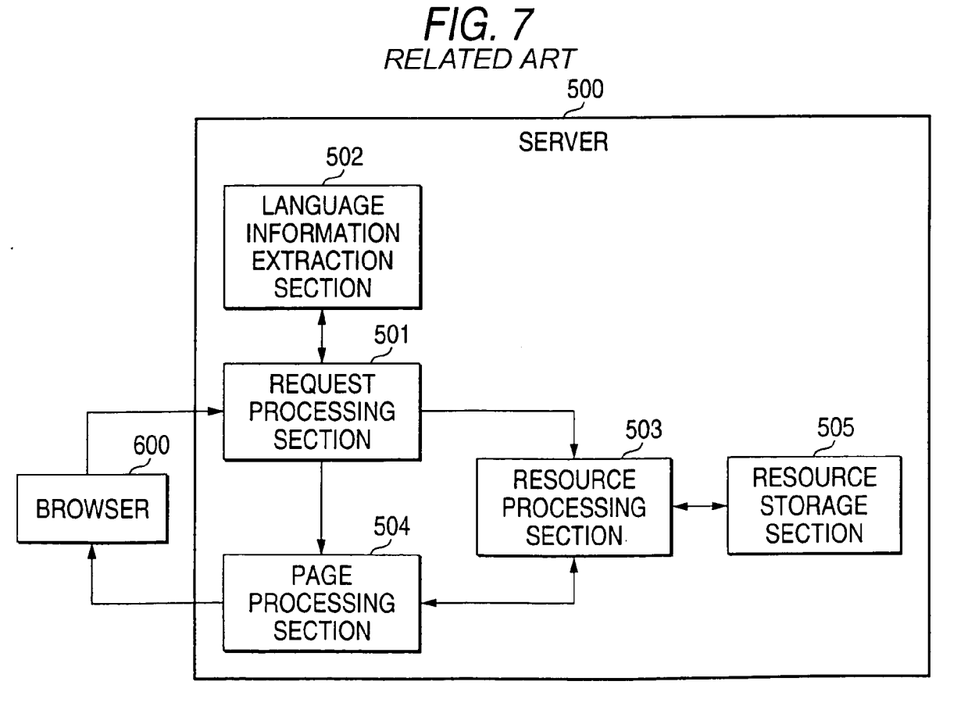
FIG. 7 is a block diagram to show a server configuration in a related art.

FIG. 7 is a block diagram to show a server configuration in a related art for providing a dynamic web page. As shown in the figure, a server 500 comprises a request processing section 501, a language information extraction section 502, a resource processing section 503, a page processing section 504, and a resource storage section 505.

In the configuration, when the user enters a URL with a browser 600, presses a form button, or clicks on a link, the browser 600 transmits a request to the server 500. This request also contains language information set in the browser 600.

In the server 500, when the request processing section 501 accepts the request, the language information extraction section 502 extracts the language information contained in the request and sends the extracted language information through the request processing section 501 to the resource processing section 503.

Next, to generate a page returned to the browser 600, the request processing section 501 executes processing of a dynamic page stored in the page processing section 504. The dynamic page is a format in which a program is embedded in a page described in HTML, etc. As the program is processed, the page returned to the browser 600 is completed. This means that the dynamic page acts as a template to generate a page.

Figure 8:
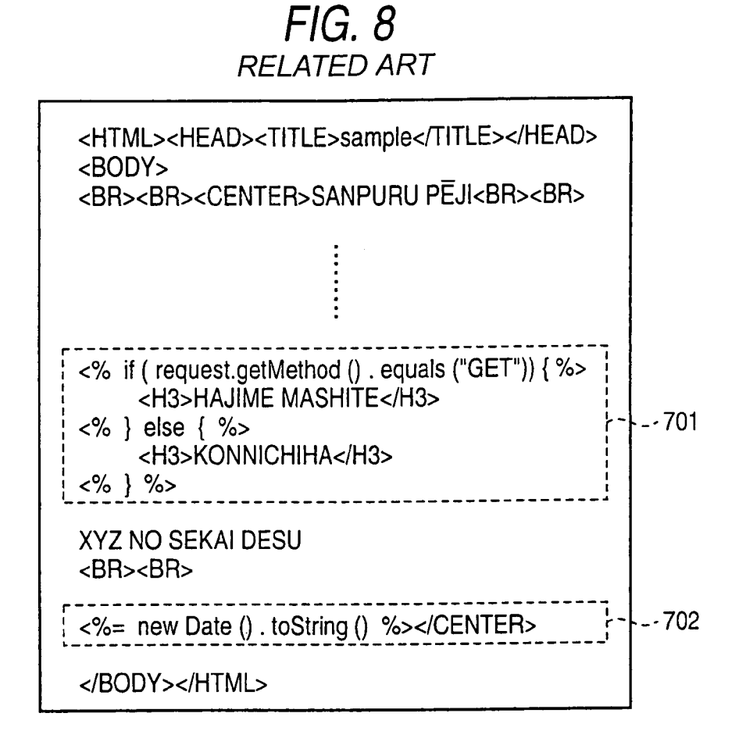
FIG. 8 is a drawing to show a description example of a dynamic page.
Figure 9:
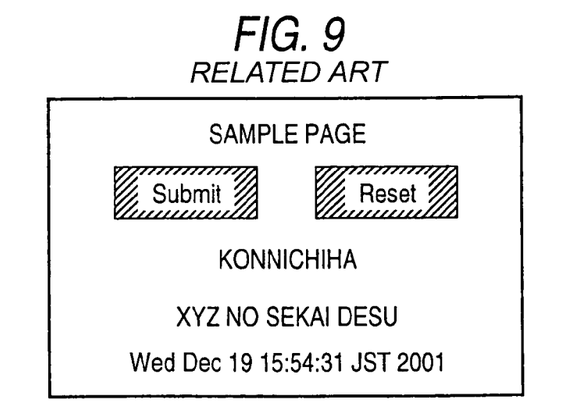
FIG. 9 is a drawing to show a processing result example of the dynamic page in FIG. 8.

FIG. 8 shows a description example of a dynamic page. In the figure, programs are denoted by numerals 701 and 702 and others are described in HTML. The processing result of the dynamic page is displayed as a page as shown in FIG. 9. However, Japanese character strings are described on the dynamic page shown in FIG. 8 and thus the page displayed in the browser 600 also becomes Japanese.

Figure 10A:
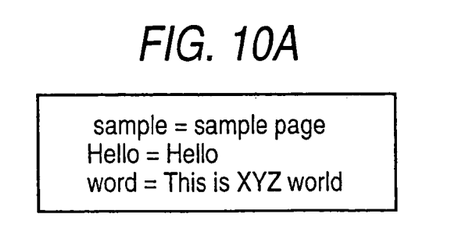
FIGS. 10A and 10B are drawings to show examples of external files of resource description.
Figure 10B:
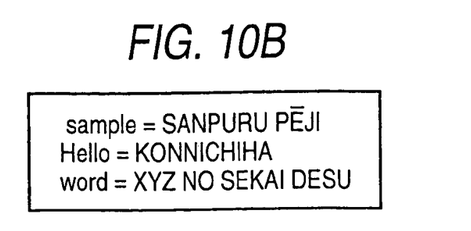

To avoid this and return a page responsive to the language information set in the browser 600, the character strings described in the page are stored in the resource storage section 505 as external files, and the external file corresponding to the language information is acquired through the resource processing section 503. The external files are described as shown in FIGS. 10A and 10B, for example.

By the way, most of the browsers 600 enable the user to specify a plurality of desired languages to which the priority is given. In contrast, when a resource is acquired from the resource storage section 505, only one language can be specified.

Thus, if the resource corresponding to the specified one language does not exist in the server 500 in the related art, a page described in the language fitted for setting in the browser 600 cannot be returned. A response cannot be returned.

To return a page based on the language information set in the browser 600 as a response, all character strings depending on the language in the page must be acquired from the resource storage section 505. On the other hand, generally most of dynamic page include language-dependent character strings. Describing a dynamic page containing such a program to acquire all the character strings from the resource storage section 505 becomes a burden of web application construction.

One of the advantages of a dynamic page is that a program to generate a dynamic message, etc., is entered in a part of the displayed page and the page design can be understood by seeing the description of the dynamic page like description in HTML. However, if character strings other than the dynamic message are also acquired externally, the advantage is spoiled.

SUMMARY OF THE INVENTION

It is therefore an object of the invention to provide a web page providing method and apparatus and program capable of providing a web page described in an appropriate format responsive to the user, for example, in an appropriate language.

To the end, according to a first aspect of the invention, there is provided a web page providing method for providing a web page responsive to a request from a browser, the method comprising the steps of preparing a plurality of types of web pages responsive to a display request from the browser for each display request, selecting a web page of the type based on specification information from among the plurality of types of web pages, and providing the selected web page for the browser.

A second aspect of the invention is characterized by the fact that the web page providing method of the first aspect further comprises the steps of preparing a plurality of types of web pages containing program description for each display request and preparing a plurality of types of resources required by processing of the program; selecting a web page of the type based on the specification information from among the plurality of types of web pages and executing processing of the program described in the web page; when a resource is required by processing of the program, selecting a resource of the type based on the specification information from among the plurality of types of resources; and providing the web page resulting from executing processing of the program for the browser.

A third aspect of the invention is characterized by the fact that in the web page providing method of the first aspect, the specification information is generated based on at least one of browser information set in the browser, user information acquired through the browser, and preset information.

A fourth aspect of the invention is characterized by the fact that in the web page providing method of the third aspect, the specification information includes a plurality of pieces of information each having a priority.

A fourth aspect of the invention is characterized by the fact that in the web page providing method of the first aspect, the specification information is information specifying a web page description language.

According to a sixth aspect of the invention, there is provided a web page providing apparatus for providing a web page responsive to a request from a browser, the apparatus comprising web page storage means for storing a plurality of types of web pages responsive to a display request from the browser for each display request; type specification means for specifying a web page of the type to be provided from among the plurality of types of web pages stored in the web page storage means; and web page providing means for providing the web page of the type specified by the type specification means for the browser.

A seventh aspect of the invention is characterized by the fact that the web page providing apparatus of the sixth aspect further comprises program processing means for processing the program described in the web page; and resource storage means for storing a plurality of types of resources required by processing of the program by the program processing means, wherein the web page storage means stores a plurality of types of web pages containing program description for each display request, and wherein the type specification means specifies a resource of the type to be used from among the plurality of types of resources stored in the resource storage means together with the type of web page to be provided.

An eighth aspect of the invention is characterized by the fact that in the web page providing apparatus of the sixth aspect, the type specification means specifies the type based on at least one of browser information set in the browser, user information acquired through the browser, and preset information.

A ninth aspect of the invention is characterized by the fact that in the web page providing apparatus of the eighth aspect, the type specification means adopts at least one of specification based on the browser information, specification based on the user information, and specification based on the preset information as specification of the type in accordance with preset priority.

A tenth aspect of the invention is characterized by the fact that in the web page providing apparatus of the sixth aspect, the type specification means specifies a web page description language.

According to an eleventh aspect of the invention, there is provided a web page providing program for causing a computer to provide a web page responsive to a request from a browser, the program for executing the steps of selecting a web page of the type based on specification information from among a plurality of types of web pages prepared for each display request from the browser and providing the selected web page for the browser.

A twelfth aspect of the invention is characterized by the fact that the web page providing program of the eleventh aspect executes the steps of selecting a web page of the type based on the specification information from among the plurality of types of web pages containing program description prepared for each display request and executing processing of the program described in the web page; selecting a resource required with processing of the program based on the specification information from among the plurality of types of resources prepared; and providing the web page resulting from executing processing of the program for the browser.

A thirteenth aspect of the invention is characterized by the fact that in the web page providing program as claimed in claim 11, the specification information is generated based on at least one of browser information set in the browser, user information acquired through the browser, and preset information.

A fourteenth aspect of the invention is characterized by the fact that in the web page providing program of the thirteenth aspect, the specification information includes a plurality of pieces of information each having a priority.

A fifteenth aspect of the invention is characterized by the fact that in the web page providing program of the eleventh aspect, the specification information is information specifying a web page description language.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Referring now to the accompanying drawings, there are shown preferred embodiments of a web page providing method and apparatus and program according to the invention.

Figure 1:
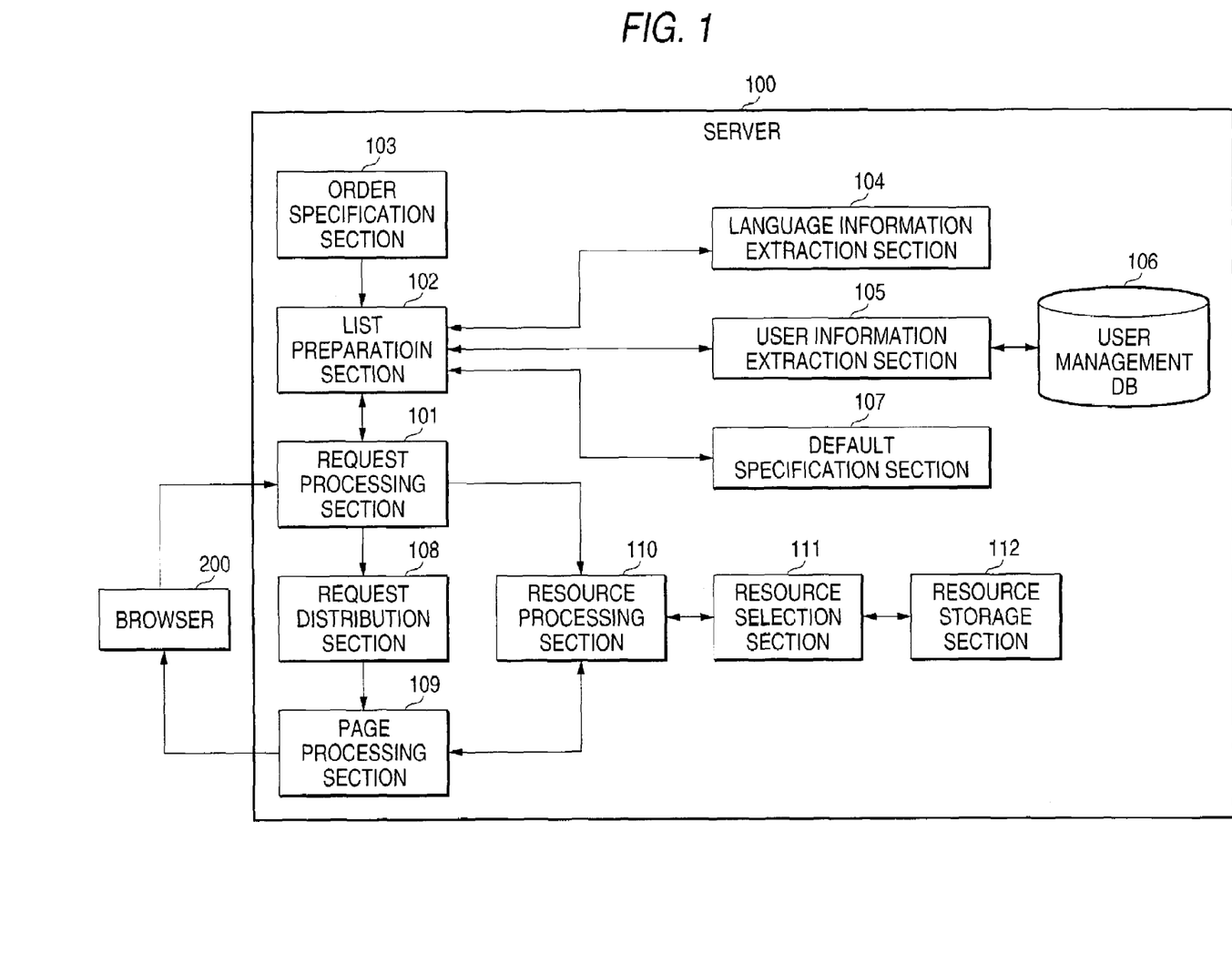
FIG. 1 is a block diagram to show the configuration of a web server incorporating the invention.

FIG. 1 is a block diagram to show the configuration of a web server incorporating the invention. As shown in the figure, a server 100 comprises a request processing section 101, a list preparation section 102, an order specification section 103, a language information extraction section 104, a user information extraction section 105, a user management DB 106, a default specification section 107, a request distribution section 108, a page processing section 109, a resource processing section 110, a resource selection section 111, and a resource storage section 112.

The request processing section 101 accepts a request transmitted from a browser 200 and performs processing to display a page based on the request. The list preparation section 102 prepares a locale list to specify the language used for a page for each request accepted by the request processing section 101 and returns the locale list to the request processing section 101. The order specification section 103 specifies the order of the locale list prepared by the list preparation section 102, and the order is specified by the administrator, etc., of the server 100.

The language information extraction section 104 extracts language information set in the browser 200 from the request transmitted from the browser 200. The user information extraction section 105 acquires information to identify the user from the browser 200 and acquires information concerning the used language in user information managed in the user management DB 106 based on the acquired information. The user information extraction section 105 may acquire language information explicitly specified directly by the user through the browser 200. To do this, selection means of a pull-down menu, etc., is displayed on a web page provided for the browser 200 and the language selected by the user out of the selection means is acquired, etc. The default specification section 107 stores language information used as the default.

The request distribution section 108 distributes the requests accepted by the request processing section 101 based on the locale list. The page processing section 109 stores description of the dynamic page to correspond to each of the requests transmitted by the browser 200 in a plurality of languages, and executes processing of the dynamic page based on the requests distributed by the request distribution section 108.

The resource processing section 110 executes processing concerning resources based on a processing request received from the page processing section 109. At this time, if a resource needs to be acquired, the resource processing section 110 requests the resource selection section 111 to acquire the resource based on the locale list received from the request processing section 101. The resource selection section 111 references the locale list and acquires the resource whose acquisition is requested by the resource processing section 110 from the resource storage section 112. There source storage section 112 stores resources described in a plurality of languages.

The sections making up the server 100 are implemented as a computer is operated by a program. The program is made up of modules provided in a one-to-one correspondence with the sections, but all modules may be implemented as one program module. The number of computers for executing the program modules may be one or may be two or more. This means that the server 100 itself may be made up of two or more computers.

Figure 2:
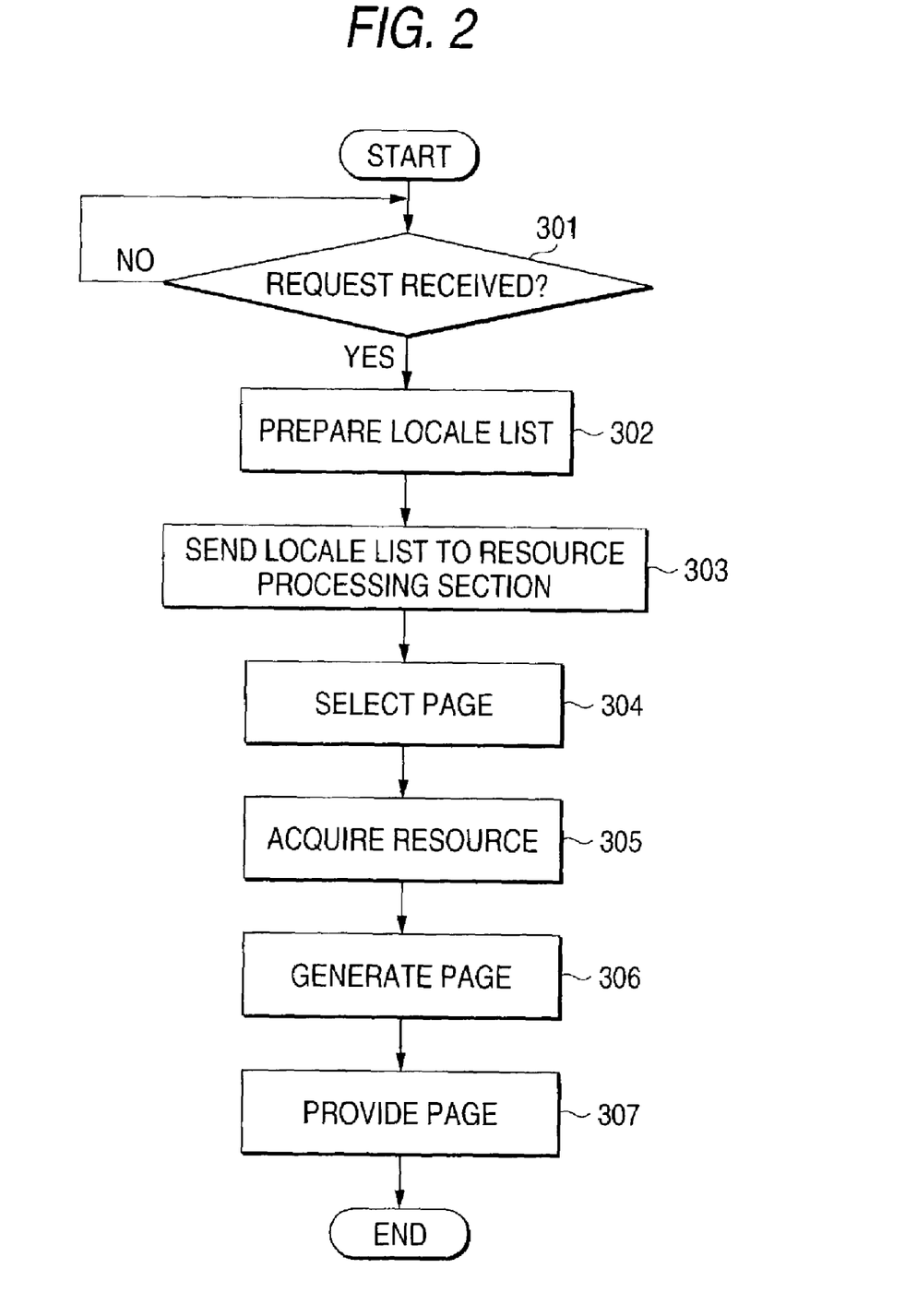
FIG. 2 is a flowchart to show an operation flow of a server.

Next, the operation of the server 100 will be discussed. FIG. 2 is a flowchart to show an operation flow of the server 100.

In the server 100, when the request processing section 101 accepts a request transmitted from the browser 200 (YES at step 301), the list preparation section 102 prepares a locale list (step 302). The locale list sets the priority based on the order specified by the order specification section 103. For example, if the order of "user information, browser information, and default" is specified by the order specification section 103, the language specified in the user information extracted from the user management DB 106 by the user information extraction section 105 based on the user identification information contained in the request is assigned the highest priority and the language information in the browser 200 extracted from the request by the language information extraction section 104 is assigned the second highest priority. The list preparation section 102 thus generates a locale list indicating the order of the language specified in the user information, the language information in the browser 200, and the language information contained in the default specification section 107. However, if the user identification information cannot be extracted from the request or the user is not registered in the user management DB 106, the user information is ignored.

If the language information is extracted in the language information extraction section 104, the user information extraction section 105, and the default specification section 107, the locale list is prepared according to the priority assigned in the order as specified by the order specification section 103. For example, when the language information extraction section 104 extracts "English," the user information extraction section 105 extracts "Japanese," and "Japanese" is set in the default specification section 107, if the order of "user information, browser information, and default" is specified, a locale list indicating the order of "Japanese and English" is prepared.

Next, the locale list prepared by the list preparation section 102 is returned to the request processing section 101, which then sends the locale list to the resource processing section 110 (step 303) and also sends the locale list and the request to the request distribution section 108.

Figure 3:
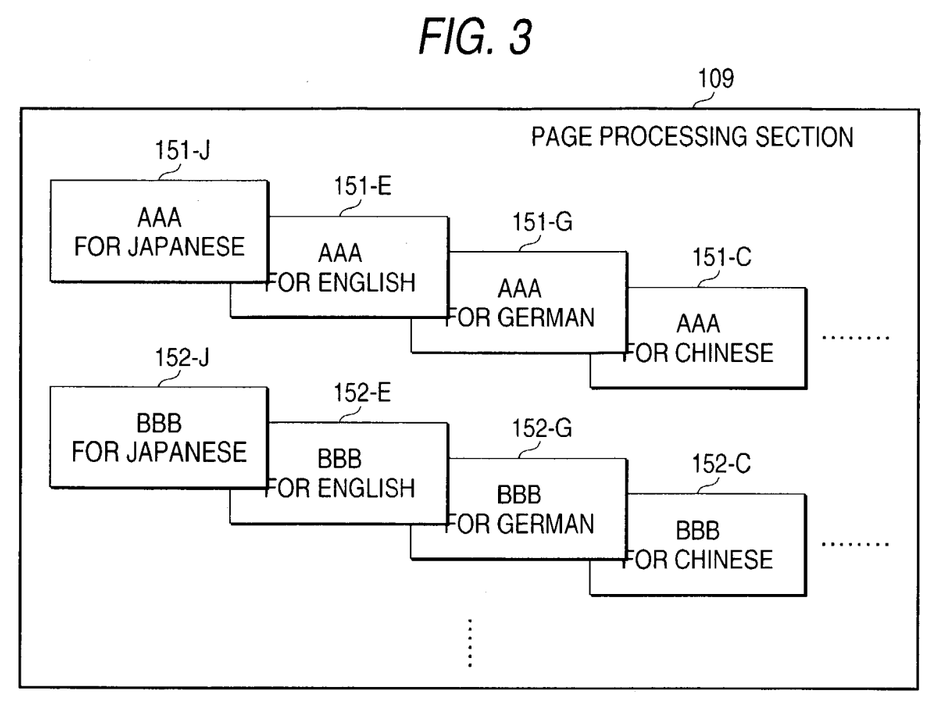
FIG. 3 is a drawing to show a configuration example of a page processing section.

Subsequently, upon reception of the locale list and the request, the request distribution section 108 selects a dynamic page executed based on the locale list and the request (step 304), and the page processing section 109 executes processing concerning the selected dynamic page. The page processing section 109 stores dynamic pages corresponding to a plurality of languages for each request, as shown in FIG. 3. For example, page 151-J corresponding to Japanese, page 151-E corresponding to English, page 151-G corresponding to German, page 151-C corresponding to Chinese, and the like are stored for page "AAA" displayed in response to the request, and page 152-J corresponding to Japanese, page 152-E corresponding to English, page 152-G corresponding to German, page 152-C corresponding to Chinese, and the like are stored for page "BBB." The request distribution section 108 determines which page contained in the page processing section 109 is to be processed by the page processing section 109, and the page processing section 109 executes processing of the dynamic page in response to the determination (distribution) result.

Figure 4:
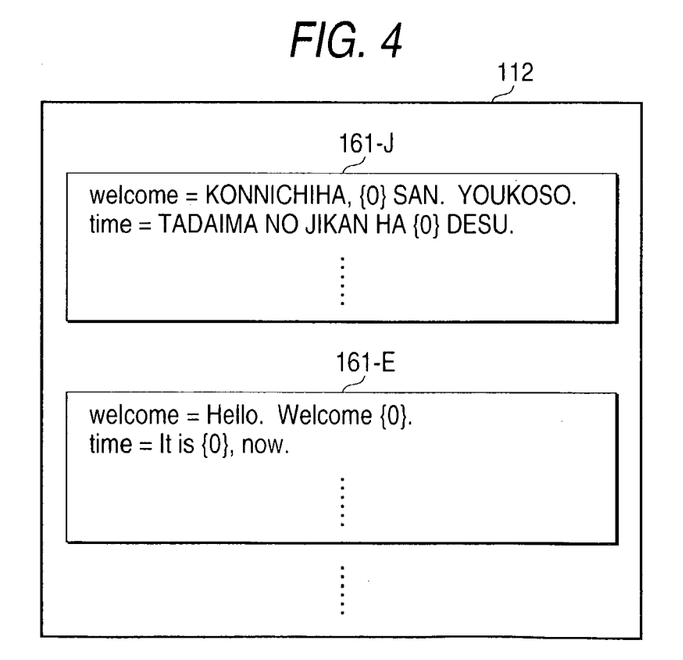
FIG. 4 is a drawing to show a configuration example of a resource storage section.

When the page processing section 109 executes processing of the dynamic page, it requests the resource processing section 110 to acquire a resource, etc., and the resource processing section 110 acquires the resource from the resource storage section 112 through the resource selection section 111 and returns the acquired resource to the page processing section 109 (step 305). The resource storage section 112 stores resources corresponding to a plurality of languages, such as a Japanese resource file 161-J and an English resource file 161-E, as shown in FIG. 4. Thus, first, the resource processing section 110 passes a key passed from the page processing section 109, for example, "welcome" and the locale list to the resource selection section 111. The resource selection section 111 selects a resource file stored in the resource storage section 112 based on the locale list, and passes the resource file name of the selected resource file and the key to the resource storage section 112. The resource storage section 112 returns a character string corresponding to the key from the specified resource file to the resource selection section 111 through which the character string is returned to there source processing section 110. For example, if the resource selection section 111 specifies the Japanese resource file 161-J and passes the key "welcome" to the resource storage section 112, the resource storage section 112 returns corresponding character string "konnichiha, {0}san. youkoso." The resource processing section 110 acquires the user name, for example, based on the program description of the dynamic page, assigns the user name to the character string of the resource to prepare character string "konnichiha, suzukisan. youkoso," and returns this character string to the page processing section 109.

Next, the page processing section 109 generates a page based on the resource acquired by the resource processing section 110 (step 306), provides the generated page for the browser 200 (step 307), and terminates the processing.

Figure 5:
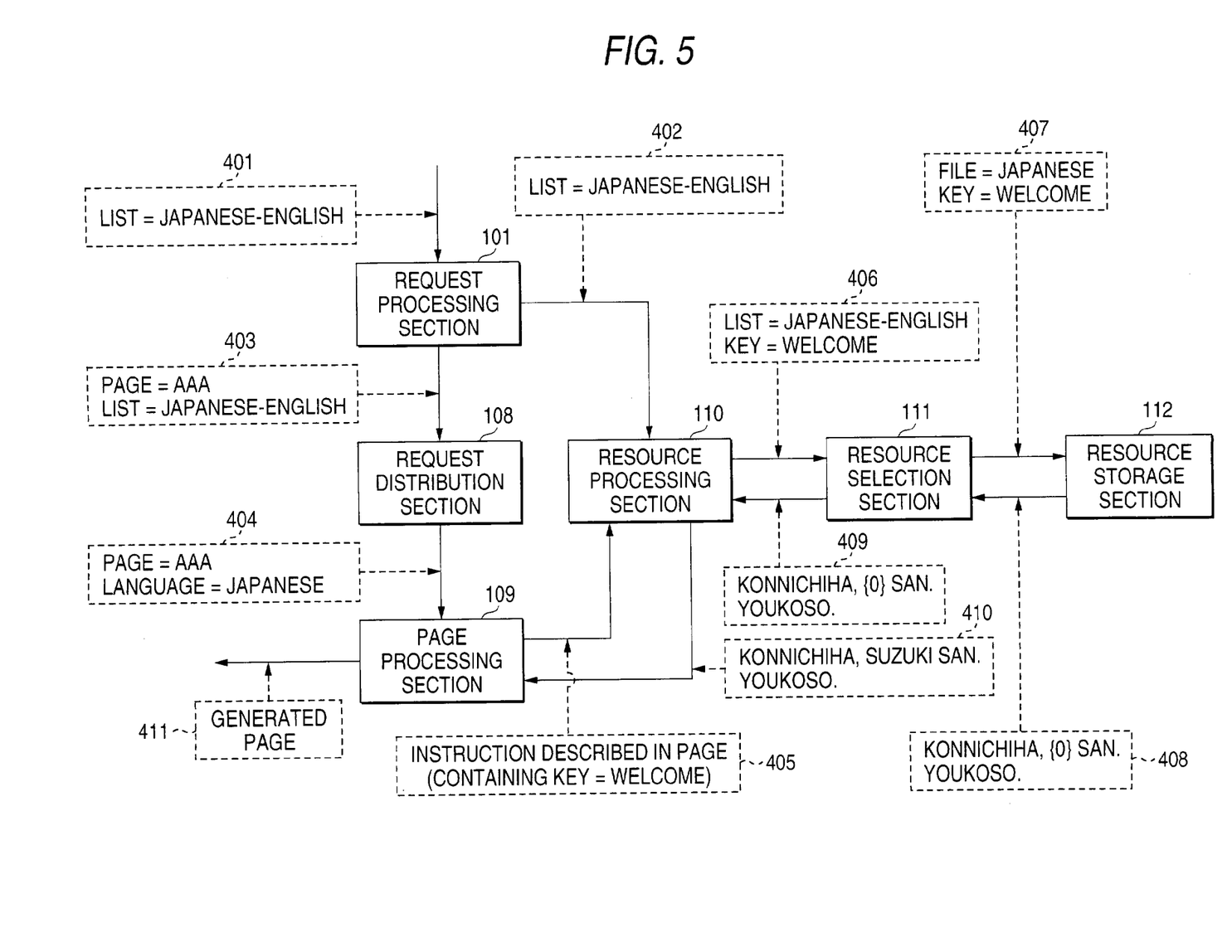
FIG. 5 is a drawing to describe a flow of data transferred among the sections of the server.

Next, the operation of the server 100 described above will be discussed from the viewpoint of a flow of data transferred among the sections of the server 100. FIG. 5 is a drawing to describe the flow of data transferred among the sections of the server 100.

First, when the request processing section 101 accepts a request transmitted from the browser 200 and the list preparation section 102 prepares a locale list indicating the order of "Japanese and English," for example, the locale list is returned to the request processing section 101 as data 401.

The request processing section 101 sends the locale list to the resource processing section 110 as data 402 and also sends the locale list and page information "AAA" specified in the request together to the request distribution section 108 as data 403.

Upon reception of the data 403, the request distribution section 108 passes data 404 specifying "AAA" corresponding to "Japanese" of the dynamic page to be processed to the page processing section 109. At this time, if the "Japanese" page corresponding to "AAA" does not exist, the request distribution section 108 specifies "AAA" corresponding to "English" assigned the second highest priority in the locale list.

Next, the page processing section 109 starts processing of the dynamic page specified in data 404. In the processing, the program portion described in the dynamic page is passed to the resource processing section 110 as data 405. The program is an instruction, for example, "build user name in resource specified in key 'welcome'."

Upon reception of the data 405, the resource processing section 110 passes the locale list received as the data 402 together with the key "welcome" contained in the data 405 to the resource selection section 111 as data 406. The resource selection section 111 passes the key "welcome" together with specification of the "Japanese" resource file assigned the highest priority in the received locale list to the resource storage section 112 as data 407.

Next, the resource storage section 112 returns the (Japanese) character string "konnichiha, {0}san. youkoso." specified in the key "welcome" from the specified "Japanese" resource file to the resource selection section 111 as data 408, and the resources election section 111 returns the character string to the resource processing section 110 as data 409. At this time, if the specified "Japanese" resource file does not contain the key "welcome" or the specified "Japanese" resource file itself does not exist, the resource storage section 112 returns an error to the resource selection section 111. In this case, the resource selection section 111 receiving the error passes the key "welcome" together with specification of the "English" resource file assigned the second highest priority in the locale list to the resource storage section 112.

Figure 6:
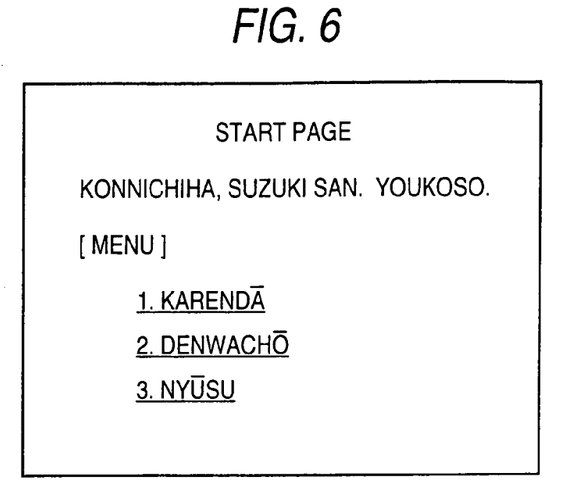
FIG. 6 is a drawing to show an example of a page displayed in a browser.

The resource processing section 110 receiving the data 409 inserts the user name separately acquired into the part of "{0}" of the character string "konnichiha, {0}san. youkoso." to prepare character string "konnichiha, suzukisan. youkoso." and passes this character string to the page processing section 109 as data 410. The page processing section 109 generates the page to be displayed based on the data 410, provides the generated page for the browser 200 as data 411, and terminates the processing. The data 411 provided for the browser 200 is displayed as a page as shown in FIG. 6.

By the way, in the server 100 shown in FIG. 1, there is a possibility that the resource and page languages will not match. As the simplest method to circumvent this, both the resource and the page are prepared so that the resource stored in the resource storage section 112 and the dynamic page stored in the page processing section 109 correspond reliably to each other.

However, if it is difficult to prepare both the resource and the page so that they correspond to each other, the resource selection section 111 prepares a list of languages to which the required resource corresponds in the languages in the locale list. When the request processing section 101 passes the locale list to the resource processing section 110, the resource processing section 110 acquires the list prepared by the resource selection section 111 and returns the list to the request processing section 101, and the request distribution section 108 references the list and distributes the request. Accordingly, the language of the dynamic page processed in the page processing section 109 and the language of the resource acquired from the resource storage section 112 match.

Next, a specific example of the server 100 will be discussed. For example, it is assumed that a web application requiring that the user should enter the user name and password for log-in is executed in the server 100.

In the web application, it is assumed that the language information combination order to determine the priorities of the languages of the page to be displayed is specified as the order of "user information, browser language information, and default" by the order specification section 103. The reason why the language information set in the browser 200 is not assigned the highest priority is that usually if a browser of a version of one language is installed, the language is set in the browser and fewer users change the setting for themselves and thus if the user installs a browser of a different language from the language used by the user, the actual used language by the user and the language information in the browser may differ.

As the first action, in response to the user operation, a request for the URL to the web application is transmitted from the browser 200 to the server 100. For the request, if the user does not yet log in at this time, a log-in screen is displayed in the browser 200; at this time, user information cannot be acquired (however, a cookie is set, etc., in the browser 200, another case is applied), and thus the log-in screen is displayed in accordance with setting of the language information in the browser.

After this, if the user logs in, it is made possible for the user information extraction section 105 to acquire user information from the user management DB 106 and thus the later screen is described in the language set in the user information.

Next, another use example of the server 100 will be discussed. The use example assumes that the reliability of the user language information stored in the user management DB 106 is low.

Assume that a web application for providing one electronic mail-order firm page exists. It is a mail-order page based on Japan and most customers are Japanese, but some are oversea customers. Although the page has been provided only in Japanese, the system is reformed as a new internationalized application system capable of providing the page in the language responsive to each customer. Attribute to store information on the language to be displayed to the user does not exist in the user management DB 106 in the old system, but attribute to store information on the language is also added to the user management DB 106 accompanying construction of the new system. However, Japanese is set across the board as language information for already existing users although as for new users, it is also indispensable to register language information when the user registers personal information so that proper language information is stored. If a user information change screen is also provided for already existing users for enabling the users to also set the language, there is a problem if the language information in the user management DB 106 is used as the first candidate for the language to be used.

In such a case, it is considered that the reliability of the language information in the browser 200 is higher than that of the information in the user management DB 106. Then, preferably the order specified in the order specification section 103 is set to "browser language information, user information, and default" and the information in the user management DB 106 is handled as auxiliary information if a page in the language set in the browser 200 does not exist.

It is also possible to rewrite a new order into the order specification file when reforming the user management DB 106 is advanced as time goes by. It is also possible to construct a system for changing the order for each user in such a manner that the user management DB 106 is provided with flag information indicating whether or not the user registers language information and the order specification section 103 references the flag and sets "user information-browser language information-default locale" for the user with the flag set indicating that the user registers language information.

As an example wherein the language information set in the browser 200 is assigned the highest priority, the case where a plurality of pieces of language information are set in the browser 200 can be named, because a plurality of pieces of language information can be set in the browser 200, but usually default is not set. Therefore, it is considered that in the browser 200 in which a plurality of pieces of language information are set, it may be said that the user explicitly sets the languages as he or she desires. In this case, the list preparation section 102 performs processing so that the language extracted in the language information extraction section 104 takes precedence over the specification of the order specification section 103.

Only processing concerning languages has been described. However, for example, pages responsive to the types of browsers are stored in the page processing section 109 and the request distribution section 108 performs distribution processing responsive to the type of browser, whereby an appropriate page can be displayed regardless of whether the browser aims at CHTML or HDML.

As described above, according to the invention, a web page responsive to a display request from the browser is prepared in a plurality of languages for each display request, and a web page responsive to the specified language is selected from among a plurality of types of web pages and is provided for the browser, so that a message character string unique to the language can be described directly in a page, whereby the appearance of the page can be made as intended by the page creator.

As language specification, the language information in the browser, the information in the user management database, default locale, and the like are used in combination, so that a web page can be provided in the language more matching the user's desire.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A web page providing method comprising:
   receiving a display request;
   extracting browser information and user information from the received display request;
   generating priorities for use in determining a language for use in displaying the web page based on the extracted browser information, the extracted user information and preset information, wherein the browser information and the user information indicate different languages;
   selecting one of plural web pages written in plural languages corresponding to the received display request, the selected one of the plural web pages being written in the language having the highest priority;
   if the web page written in the language having the highest priority does not exist, selecting another one of the plural web pages, the selected another one of the plural web pages being written in another language having the second highest priority; and
   outputting the selected one of the plural web pages or the selected another one of the plural web pages.

2. A web page providing apparatus comprising:
   a receiving unit that receives a display request;
   a storage unit that stores groups of web pages, the web pages of each group describing the same content in different languages;
   an extraction unit that extracts browser information and user information from the received display request;
   a generation unit that generates priorities for use in determining a language for use in displaying the web page based on the extracted browser information, the extracted user information and preset information, wherein the browser information and the user information indicate different languages;
   a selection unit that selects one of the stored web pages belonging to one of the groups of web pages, corresponding to the received display request, the selected one of the stored web pages being written in a language having the highest priority, wherein:
   if the web page written in the language having the highest priority is not stored in the storage unit, the selection unit selects another one of the stored web pages belonging to the group corresponding to the received display request,
   the another one of the stored web pages is written in another language having the second highest priority; and
   the selection unit outputs the selected one of the stored web pages or the selected another one of the stored web pages.

3. A computer readable medium storing a program causing a computer to execute a process for providing a web page in accordance with a display request, the processing comprising:
   receiving the display request;
   extracting browser information and user information from the received display request;

generating priorities for use in determining a language for use in displaying the web page based on the extracted browser information, the extracted user information and preset information, wherein the browser information and the user information indicate different languages;

selecting one of plural web pages written in plural languages corresponding to the received display request, the selected one of the plural web pages being written in the language having the highest priority;

if the web page written in the language having the highest priority does not exist, selecting another one of the plural web pages, the selected another one of the plural web pages being written in another language having the second highest priority; and outputting the selected one of the plural web pages or the selected another one of the plural web pages.

* * * * *